(12) United States Patent
Takahashi et al.

(10) Patent No.: US 8,161,770 B2
(45) Date of Patent: Apr. 24, 2012

(54) VEHICLE AIR CONDITIONING SYSTEM

(75) Inventors: Torahide Takahashi, Tatebayashi (JP);
Yoshitomo Fukutomi, Tochigi (JP);
Yukitoshi Kobori, Sano (JP)

(73) Assignee: Calsonic Kansei Corporation, Saitama-shi (JP)

( * ) Notice: Subject to any disclaimer, the term of this patent is extended or adjusted under 35 U.S.C. 154(b) by 573 days.

(21) Appl. No.: 12/377,364

(22) PCT Filed: Jul. 31, 2007

(86) PCT No.: PCT/JP2007/064951
§ 371 (c)(1),
(2), (4) Date: Feb. 12, 2009

(87) PCT Pub. No.: WO2008/023543
PCT Pub. Date: Feb. 28, 2008

(65) Prior Publication Data
US 2010/0206001 A1 Aug. 19, 2010

(30) Foreign Application Priority Data

Aug. 22, 2006 (JP) .................................. 2006-225488
Jul. 20, 2007 (JP) .................................. 2007-189294

(51) Int. Cl.
*F25B 41/00* (2006.01)
*B60H 1/32* (2006.01)
*B60H 1/00* (2006.01)

(52) U.S. Cl. ................................ 62/513; 62/244; 165/41
(58) Field of Classification Search .................... 62/498, 62/513, 506, 519, 239, 244; 165/41, 42
See application file for complete search history.

(56) References Cited

U.S. PATENT DOCUMENTS

| 6,866,090 B2 * | 3/2005 | Takamatsu et al. ............. 165/41 |
| 2006/0137388 A1 * | 6/2006 | Kakehashi et al. ............. 62/513 |
| 2006/0218964 A1 | 10/2006 | Saito et al. |

FOREIGN PATENT DOCUMENTS

| JP | 2001-277842 A | 10/2001 |
| JP | 2002-228072 A | 8/2002 |
| JP | 2002-372319 A | 12/2002 |
| JP | 2002372319 A | * 12/2002 |
| JP | 2004-106799 A | 4/2004 |
| JP | 2004-211917 A | 7/2004 |
| JP | 2004-306686 A | 11/2004 |
| JP | 2005-009851 A | 1/2005 |
| JP | 2005-112226 A | 4/2005 |
| JP | 2005-114283 A | 4/2005 |
| JP | 2006-177632 A | 7/2006 |
| JP | 2007-024451 A | 2/2007 |
| JP | 2007-040690 A | 2/2007 |
| JP | 2007-055553 A | 3/2007 |

* cited by examiner

OTHER PUBLICATIONS

Chinese Office Action and English Translation dated Mar. 11, 2010, 10 pages.

*Primary Examiner* — Chen Wen Jiang
(74) *Attorney, Agent, or Firm* — Foley & Lardner LLP

(57) ABSTRACT

Disclosed is a vehicle air conditioning system including not less than two evaporators 3, 4, in which internal heat exchangers 5, 6 are provided to the respective evaporator 3, 4, a first evaporator 3 is placed in a front part of a compartment 8A whereas a second evaporator 4 is placed in a rear part of the compartment 8B; and the second evaporator 4 is connected to the internal heat exchanger 6 extended from the engine room 7 to the compartment 8. The internal heat exchanger 6 has a triple tube structure in which a heat insulator 15 is provided between a high-pressure medium passage 13 and a low-pressure medium passage 14.

5 Claims, 3 Drawing Sheets

VEHICLE AIR CONDITIONING SYSTEM

TECHNICAL FIELD

The present invention relates to an air conditioning system for a vehicle, particularly to a vehicle air conditioning system of a dual air conditioner type.

BACKGROUND ART

Japanese Patent Application Laid-open Publication No. 2004-106799 discloses a vehicle air conditioning system of a dual air conditioner type including: a front-seat air conditioning unit for conditioning air for the front seat; and a rear-seat air conditioning unit for conditioning air for the rear seat.

This type of vehicle air conditioning system has a configuration in which evaporators are provided respectively to the front-seat air conditioning unit and the rear-seat air conditioning unit, and in which one internal heat exchanger is employed as a common heat exchanger between the front-seat and rear-seat air conditioning units.

DISCLOSURE OF THE INVENTION

In a case where the single internal heat exchanger is used commonly by the front-seat and rear-seat air conditioning units in the vehicle air conditioning system of a dual air conditioner type including the two evaporators, the internal heat exchanger is required to be large enough to have a heat exchanging capability needed for the two evaporators being simultaneously in operation.

As a result, in this vehicle air conditioning system, in a case where only the front-seat air conditioning unit is put in operation for example, only the evaporator located in the front seat side is used, too much superheat is supplied to the coolant, and thus the temperature of the coolant discharged from the compressor is raised. This results in decrease in the cycle reliability, and in restricting the operating range.

With this taken into consideration, the present invention has been made for the purpose of solving the foregoing problem. An object of the present invention is to provide a vehicle air conditioning system capable of: operating at the optimum condition regardless of the number of evaporators; enhancing the cycle reliability to a large extent with no restriction being imposed on the conditions for the system operation; and simplifying the piping structure and thus reducing the number of assembly steps.

An aspect of the present invention is a vehicle air conditioning system including: a compressor; and an external heat exchanger which exchanges heat between the external air and a coolant discharged from the compressor, the coolant whose heat is exchanged in the external heat exchanger being divided among not less than two parallel branch paths, at least one evaporator being respectively connected to each of the branch paths, masses of coolant which are evaporated by the respective evaporators becoming confluent in a merging part, and the confluent coolant being supplied to the compressor, wherein decompression devices are respectively provided on inlet sides of the evaporators which are respectively connected to each of the branch paths, and inlet side coolant of each of the decompression devices can exchange heat with outlet side coolant of each of the evaporators, respectively.

BRIEF DESCRIPTION OF THE DRAWINGS

FIG. 2($b$) is a horizontal sectional view of the internal heat exchanger connected to the second evaporator in the vehicle air conditioning system according to the present embodiment.

BEST MODE FOR CARRYING OUT THE INVENTION

Figure 1:
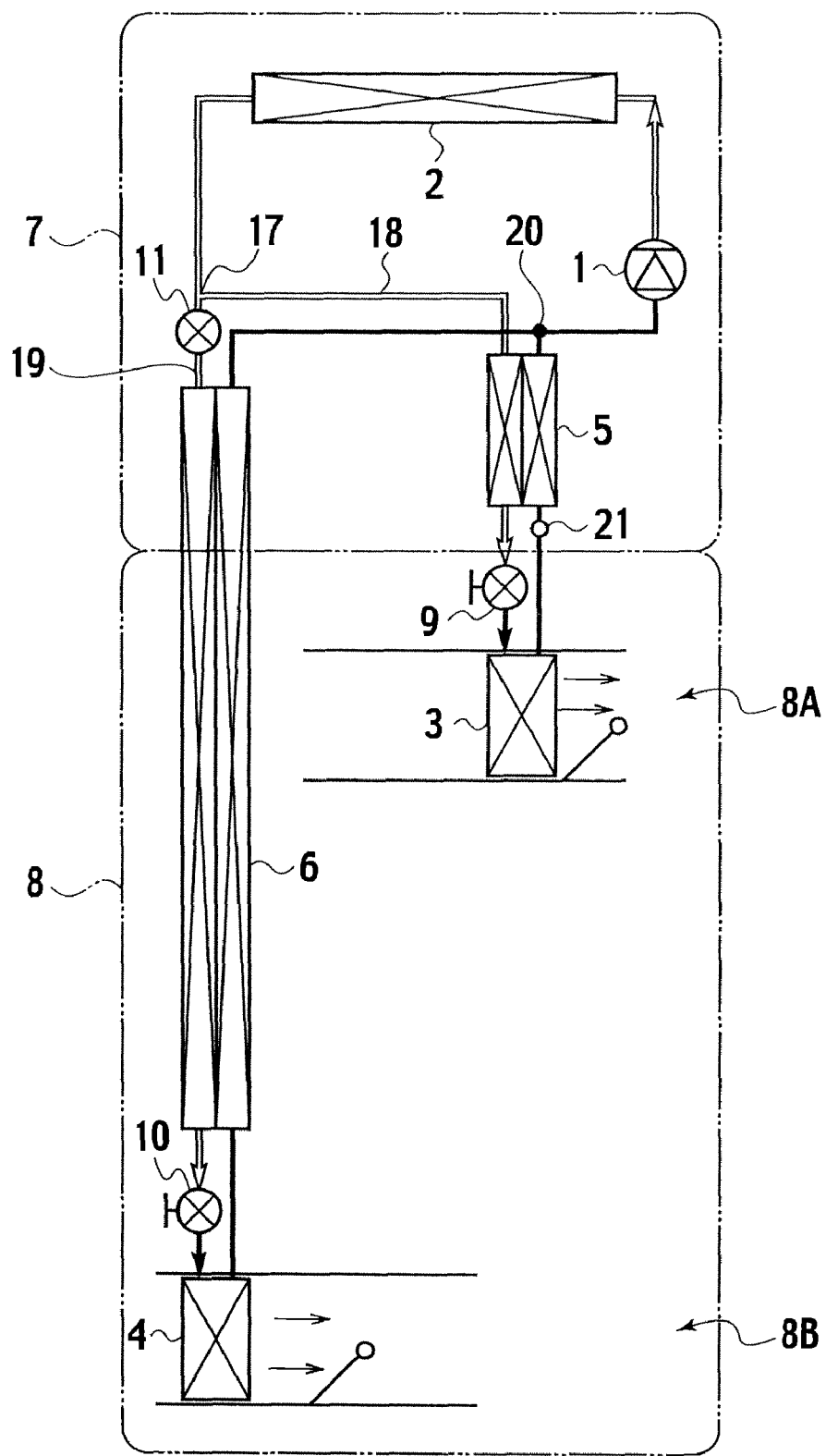
FIG. 1 is a system diagram of a vehicle air conditioning system according to the present embodiment.

Referring to the drawings, detailed descriptions will be provided below for a concrete embodiment to which the present invention is applied.

Figure 2:
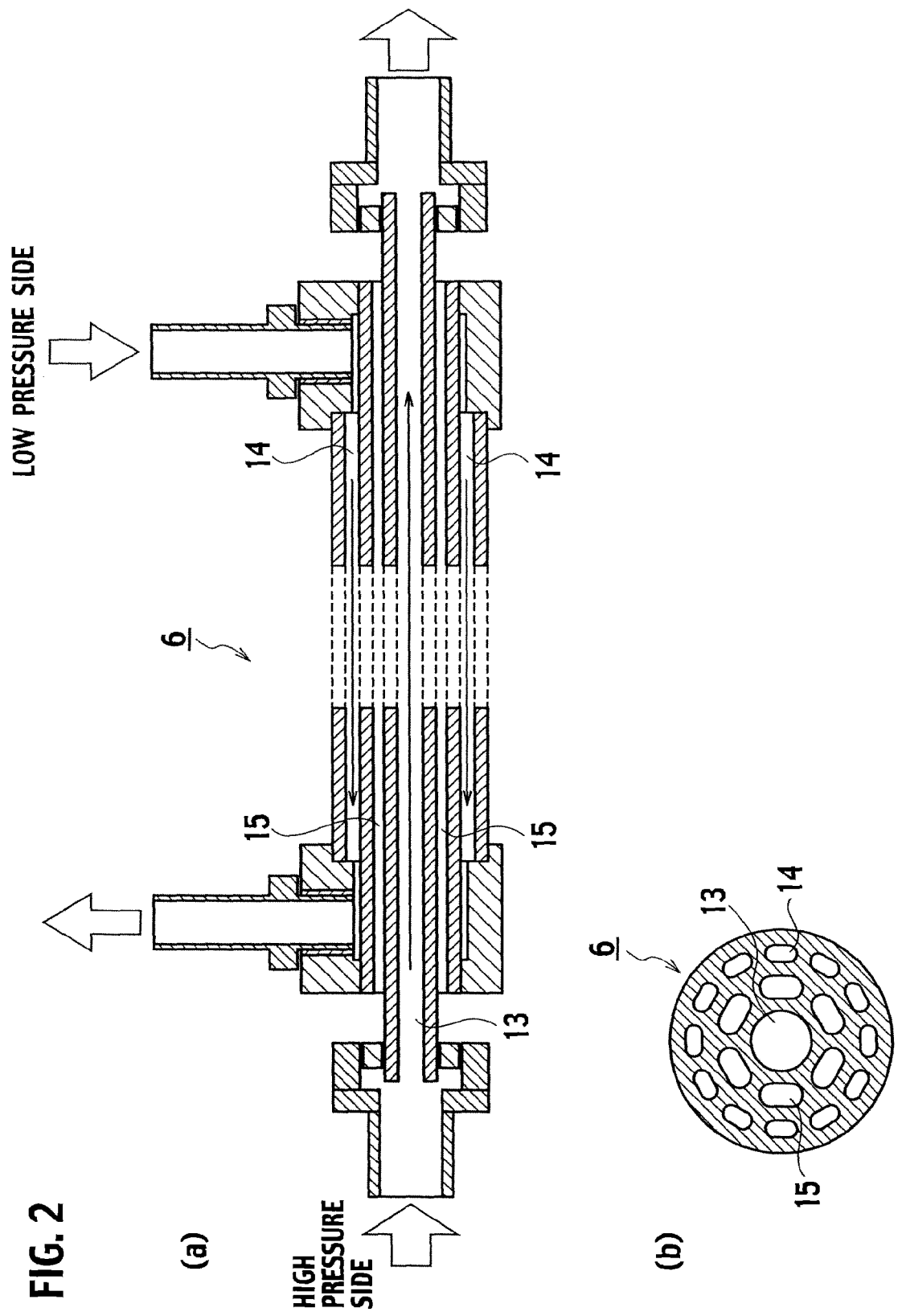
FIG. 2($a$) is a vertical sectional view of an internal heat exchanger connected to a second evaporator in the vehicle air conditioning system according to the present embodiment.
Figure 3:
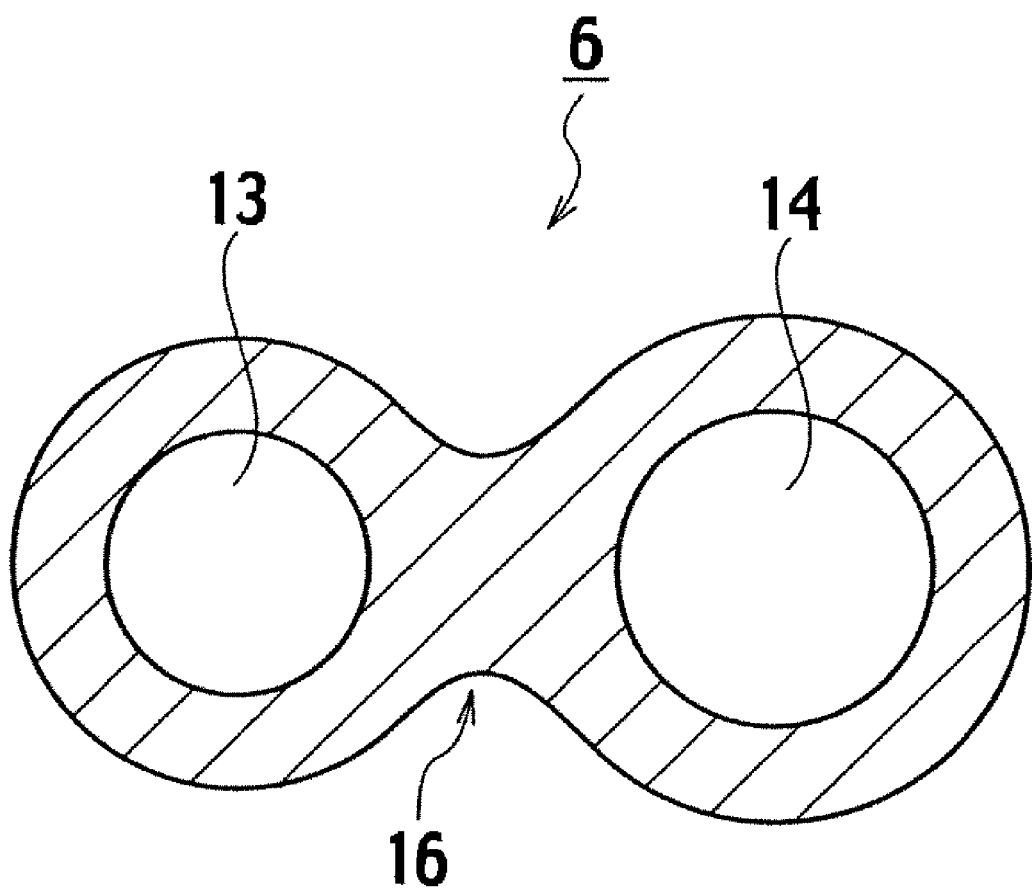
FIG. 3 is a cross-sectional view showing another example of the internal heat exchanger connected to the second evaporator in the vehicle air conditioning system according to the present embodiment.

FIG. 1 is a system diagram of a vehicle air conditioning system according to the present embodiment. FIG. 2($a$) is a vertical sectional view of an internal heat exchanger connected to a second evaporator in the vehicle air conditioning system according to the present embodiment. FIG. 2($b$) is a horizontal sectional view of the internal heat exchanger connected to the second evaporator in the vehicle air conditioning system according to the present embodiment. FIG. 3 is a cross-sectional view showing another example of the internal heat exchanger connected to the second evaporator in the vehicle air conditioning system according to the present embodiment.

The vehicle air conditioning system according to the present embodiment uses carbon dioxide gas as its coolant. The vehicle air conditioning system includes: a compressor 1 which compresses the coolant; and an external heat exchanger 2 which exchanges heat between the external air and the coolant which is compressed by the compressor 1 and whose temperature is raised by the compression. This vehicle air conditioning system has a divider part 17 at which the heat-exchanged coolant is divided between two branch paths (a first branch path 18 and a second branch path 19 in parallel). In the case of this vehicle air conditioning system, the first branch path 18 is provided with: a first evaporator 3 placed in the vehicle front-seat side located in a front part of a compartment 8A; and a first internal heat exchanger 5 correspondingly provided to the first evaporator 3, the first internal heat exchanger 5 being specialized for the first evaporator. The second branch path 19 is provided with: a second evaporator 4 placed in a vehicle rear-seat side located in a rear part of the compartment 8B; and a second internal heat exchanger 6 correspondingly provided to the second evaporator 4, the second internal heater exchanger 6 being specialized for the second evaporator.

Note that the vehicle air conditioning system according to the present embodiment is operated with the coolant in the external heat exchanger 2 being pressurized not lower than the critical pressure of the coolant.

An engine room 7 has the compressor 1 and the external heat exchanger 2 in its inside. The first evaporator 3 and the second evaporator 4 are provided in a compartment 8 located rearward of the engine room 7 of the vehicle. The second internal heat exchanger 6 is provided extending from the engine room 7 to the compartment 8.

As a decompression device, a first expansion valve 9 is provided between the first evaporator 3 and the first internal heat exchanger 5. In addition, as another decompression device, a second expansion valve 10 is provided between the second evaporator 4 and the second internal heat exchanger 6. A solenoid valve 11 for supplying the first internal heat exchanger 5 or the second internal heat exchanger 6 with the coolant which is cooled by the external heat exchanger 2 is provided to an outlet of the external heat exchanger 2. The first and second branch paths 18, 19 merge in a merging part 20. Accordingly, the confluent coolant is supplied to compressor 1.

The compressor 1 receives a drive force from a motor or vehicle driving system which is not illustrated. Thus, the compressor 1 compresses gas-phased carbon dioxide, and discharges the resultant gas-phased carbon dioxide as a high-temperature and highly-pressured coolant.

The external heat exchanger 2 causes the coolant which is compressed by the compressor 1 and whose temperature is raised by the compression, to exchange heat with the external air. Thus, the external air absorbs part of the heat of the coolant. Thereby, the external heat exchanger 2 cools the coolant.

The first evaporator 3 is placed in the inside of an air conditioning duct provided in the front-seat side. The first evaporator 3 evaporates the coolant which is low in temperature and pressure as a result of being decompressed (expanded) by the first expansion valve 9.

The first expansion valve 9 decompresses (expands) the highly-pressurized coolant outputted from the first internal heat exchanger 5, and thus causes the coolant to be atomized. Subsequently, the first expansion valve 9 outputs the atomized coolant to the first evaporator 3.

The second evaporator 4 is placed in the inside of an air conditioning duct provided in the rear-seat side. The second evaporator 4 evaporates the coolant which is low in temperature and pressure as a result of being decompressed by the second expansion valve 10.

The second expansion valve 10 decompresses the highly-pressurized coolant outputted from the second internal heat exchanger 6, and thus causes the coolant to break up into spray. Subsequently, the second expansion valve 10 outputs the spray of coolant to the second evaporator 4.

The solenoid valve 11 performs a function of switching between a coolant path through which the coolant cooled by the external heat exchanger 2 is supplied to the first evaporator 3 and a coolant path through which the coolant cooled by the external heat exchanger 2 is supplied to the second evaporator 4. In a case where the vehicle air conditioning system is operated for the front-seat side only, the solenoid valve 11 is closed, and thus the coolant is caused to flow to the first evaporator 3. This solenoid valve 11 performs switching operations in a sense that not only the coolant is caused to flow to the first evaporator 3 only, but also the coolant can be caused to flow to both the first evaporator 3 and the second evaporator 4.

In the case of the vehicle air conditioning system according to the present embodiment, the first internal heat exchanger 5 is provided exclusively for the first evaporator 3, whereas the second internal heat exchanger 6 is provided exclusively for the second evaporator 4.

The first internal heat exchanger 5 exchanges heat between the inlet side coolant of the first decompression device 9 which flow into the first branch path 18 though the divider part 17 after the heat exchange at the external heat exchanger 2, and the outlet side coolant which comes out of the first evaporator 3 after the coolant is evaporated by the first evaporator 3.

The second internal heat exchanger 6 exchanges heat between the inlet side coolant of the second decompression device 10 which flow into the second branch path 19 through the divider part 17 after the heat exchange at the external heat exchanger 2 and the outlet side coolant which comes out of the second evaporator 4 after the coolant is evaporated by the second evaporator 4. In other words, the first internal heat exchanger 5 is designed to have a heat exchanging capability which is needed when the first internal heat exchanger 5 is used in combination with the first evaporator 3. The second internal heat exchanger 6 is designed to have a heat exchanging capability which is needed when the second internal heat exchanger 6 is used in combination with the second evaporator 4 as well.

In addition, an accumulator 21 is provided downstream of the first evaporator 3. The accumulator 21 separates the outlet side coolant into the gas-phased coolant and the liquid-phased coolant and thus causes the gas-phase coolant to flow into a downstream thereof and to flow into the inlet of the first internal heat exchanger 5. Consequently, the superheat of the coolant is almost constant at the outlet of the accumulator 21.

In a system where a single internal heat exchanger is employed commonly for two evaporators, when one of the two evaporators is put in operation, too much superheat is given to the coolant, and thus the temperature of the coolant discharged from the compressor is raised. This decreases the reliability of the cycle. By contrast, the present embodiment solves these problems because the internal heat exchangers 5, 6 are employed exclusively for the respective evaporators 3, 4. By this, the vehicle air conditioning system of the present embodiment can be the optimum system even in the case where the two evaporators are put in operation simultaneously. In addition, the vehicle air conditioning system of the present embodiment can offer a comfortable environment even when the system is in operation for cooling or warming the front seat side only or the rear seat side only.

Unlike the first internal heat exchanger 5 placed in the inside of the engine room 7, the second internal heat exchanger 6 is extended from the engine room 7 to the rear of the vehicle, and is constructed as a part of the piping of the vehicle air conditioning system. If the second internal heat exchanger 6 thus constructed has the same configuration as the first internal heat exchanger 5 has, the amount of heat exchanged in the second internal heat exchanger 6 becomes too large because the second internal heat exchanger 6 is longer in length than the first internal heat exchanger 5. With this taken into consideration, the second internal heat exchanger 6 is designed to have a lower rate of heat exchange per unit length between the highly-pressurized coolant and the low-pressurized coolant than the first internal heat exchanger 5 in order that the second internal heat exchanger 6 can demonstrate almost the same level of performance as the first internal heat exchanger 5 demonstrates.

As means for implementing this design, as shown in FIG. 2, the second internal heat exchanger 6 includes: a high-pressure medium passage 13 in which the high-pressure medium (inlet side coolant) flows, and which is arranged in the central part of the second internal heat exchanger 6; multiple low-pressure medium passages 14, in each of which the low-pressure medium (outlet side coolant) flows, and which are arranged around the high-pressure medium passage 13; and heat insulators 15 provided in a region between the high-pressure medium passage 13 and the low-pressure medium passages 14 (or in a part through which heat is exchanged between the high-pressure medium and the low-pressure medium).

Each of the heat insulators 15 is formed as a hole in which air flows. As air spaces (heat-insulating barriers), the multiple heat insulators 15 are provided between the high-pressure medium passage 13 and the low-pressure medium passages 14. The placement of the heat insulators 15 between the high-pressure medium passage 13 and the low-pressure medium passages 14 suppresses the heat exchange between the high-pressure medium and the low-pressure medium, and accordingly makes it possible to prevent the excessive heat exchange even though the second internal heat exchanger 6 is long in length.

In the present embodiment, the second internal heat exchanger 6 has the triple tube structure including the high-pressure medium passage 13, the low-pressure medium passages 14 and the heat insulators 15, and is installed as a part of the piping. Accordingly, the piping to be installed from the engine room 7 to the compartment 8 can be a single piping (the second internal heat exchanger). For this reason, the vehicle air conditioning system according to the present embodiment makes it possible to simplify the piping structure, and accordingly to reduce the assembling steps in number.

In addition, the present embodiment enables heat to be exchanged between the inlet side coolant of the decompression device 9 connected to the branch path 18 and the outlet side coolant of the evaporator 3 connected to the branch path 1B, and between the inlet side coolant of the decompression device 10 connected to the branch path 19 and the outlet side coolant of the evaporator 4 connected to the branch path 19. To this end, the evaporators 3, 4 of the present embodiment are equipped with their respective exclusive heat-exchangeable parts. For this reason, the system of the present embodiment has no excessive superheat of the coolant, and accordingly prevents the temperature rise in the coolant discharged from the compressor. Thereby, the present embodiment is capable of enhancing the cycle reliability.

Moreover, in the present embodiment, the number of heat-exchangeable branch paths 18, 19 is equal to the number of evaporators 3, 4. In a case where a single internal heat exchanger is provided commonly for the multiple evaporators 3, 4, it is not necessary that the single internal heat exchanger should have a heat exchanging capability needed for the multiple evaporators 3, 4 being in operation simultaneously. Consequently, the present embodiment prevents too much superheat from being supplied to the coolant, and prevents the temperature from rising in the coolant discharged from the compressor. The present embodiment is accordingly capable of enhancing the cycle reliability.

In addition, the present embodiment has the first branch path 18 connected to the evaporator 3 placed in the front part of the compartment 8A, and the second branch path 19 connected to the evaporator 4, which extends toward the rear of the vehicle and which is placed in the rear part of the compartment 8B. For this reason, in the present embodiment, the heat-exchangeable second branch path 19 functions as a piping, and accordingly the second branch path 19 can be installed as a single piping (internal heat exchanger) extending from the engine room 7 to the compartment 8. Accordingly, the present invention can simplify the piping structure, and reduce the assembling steps in number.

Furthermore, in the present embodiment, the tubular heat exchanger in the second branch path 19 has the smaller rate of heat exchange per unit length than the tubular heat exchanger in the first branch path 18. For this reason, the present embodiment enables the second evaporator to accommodate almost the same amount of heat exchange as the first evaporator 3 does, although the second internal heat exchanger 6 is so long as to extend from the engine room 7 to the compartment 8.

Additionally, in the present embodiment, the heat insulator 15 is provided in the part through which heat is exchanged between the inlet side coolant of the decompression device 9,10 and the outlet side coolant of the evaporator 3, 4. The heat insulator 15 can prevent heat from being exchanged too much in the internal heat exchanger which is connected to the second evaporator 4, and which is so long as to extend from the engine room 7 to the compartment 8.

Moreover, the present embodiment uses carbon dioxide gas as the coolant. This scheme is more effective for the carbon dioxide air conditioning system than the HFC134a air conditioning system, because the temperature of the coolant at the outlet of the compressor in the carbon dioxide air conditioning system is higher than the temperature of the coolant at the outlet of the compressor in the HFC134a air conditioning system.

In addition, in the present embodiment, the accumulator 21 is placed between the outlet of the evaporator 3 connected to the branch path 18 and the inlet of the tubular heat exchanger 5. Accordingly the superheat at the outlet of the accumulator 21 is stabilized, and thus the refrigeration performance is enhanced.

The foregoing descriptions have been provided for the concrete embodiment to which the present invention is applied. However, the present invention is not limited to this embodiment. The present invention can be modified variously.

In the foregoing embodiment, the structure of the second internal heat exchanger is the triple tube structure in which the heat insulator 15 is provided. Instead, as shown in FIG. 3, the structure of the second internal heat exchanger 6 may be of a paired tube type whose cross-sectional form is guitar-shaped, and in which one of the two passages is assigned as the high-pressure medium passage 13 in which the high-pressure medium flows and the other of the two passages is assigned as the low-pressure medium passage 14 in which the low-pressure medium flows.

In the case of the second internal heat exchanger 6 of a paired tube type, a part 16 between the high-pressure medium passage 13 and the low-pressure medium passage 14 becomes progressively smaller in cross-sectional area. For this reason, heat exchange becomes less effective in this part. The second internal heat exchanger 6 of a paired tube type offers the same operational effects as the internal heat exchanger with the triple tube structure offers, when the second internal heat exchanger 6 of a paired tube type is used instead of the internal heat exchanger 6 with the triple tube structure.

In addition, when the amount of heat exchange is intended to be further reduced in a case where the coolant circuit to the second internal heat exchanger 6 is long, a notch can be provided in the part 16 in such a way that the notch extends in a length excluding the length needed for the amount of internal heat exchange. Thereby, the two coolant passages can be integrated into a single structure. For this reason, the present embodiment is also capable of controlling the amount of heat exchange while keeping workability for the assembling desirable.

The present embodiment has the accumulator 21 placed only between the outlet of the first evaporator 3 and the inlet of the first internal heat exchanger 5 in order to deal with the case where the coolant is caused to flow only to the first evaporator 3, and in order to deal with the case where the coolant is caused to flow to both the first and second evaporators 3, 4. However, in addition, the present embodiment may have another accumulator placed between the outlet of the second evaporator 4 and the inlet of the second internal heat exchanger 6 (may have accumulators provided between the evaporators 3, 4 and the internal heat exchangers 5, 6 which are connected to all the branch paths 18, 19, respectively). In a case where the accumulator 21 is set in one branch path only, it is desirable that the accumulator 21 should be provided in the branch path in which the coolant always flows, or in the branch path in which a larger amount heat is exchanged.

Industrial Applicability

The present invention enables heat to be exchanged between the inlet side coolant of the decompression device connected to each branch path and the outlet side coolant of the evaporator connected to the same branch path. Each evaporator is provided with its exclusive heat-exchangeable part. For this reason, the present invention prevents excessive superheat from being supplied to the coolant, and concurrently prevents the temperature of the coolant discharged from the compressor from rising. Accordingly, the present invention is capable of enhancing the cycle reliability.

The invention claimed is:

1. A vehicle air conditioning system comprising:
a compressor; and
an external heat exchanger which exchanges heat between external air and a coolant discharged from the compressor, the coolant whose heat is exchanged in the external heat exchanger being divided among not less than two parallel branch paths, each of evaporators connected to a separate one of the branch paths, masses of coolant which are evaporated by the evaporators becoming confluent coolant in a merging part, and the confluent coolant being supplied to the compressor,
wherein an inlet side of each of the evaporators includes a decompression device, inlet side coolant of each of the decompression devices is configured to exchange heat with outlet side coolant of a separate one of the evaporators, respectively,
wherein a first branch path is connected to one of the evaporators in a front part of a compartment, and a second branch path extends toward a rear of the vehicle and connects to one of the evaporators in a rear part of the compartment,
wherein parts, in which the inlet side coolant of each of the decompression devices connects to each of the first and second branch paths coolant and exchanges heat with the outlet side coolant of each of the evaporators, respectively, are formed of tubular heat exchangers, and
wherein in the tubular heat exchangers, a rate of heat exchange per unit length of the tubular heat exchanger in the second branch path is set smaller than that of the tubular heat exchanger in the first branch path.

2. The vehicle air conditioning system according to claim 1, wherein the number of branch paths equals the number of evaporators.

3. The vehicle air conditioning system according to claim 1, wherein a heat insulator is provided to each part in which heat is exchanged between the inlet side coolant of one of the decompression devices and the outlet side coolant of one of the evaporators.

4. The vehicle air conditioning system according to claim 1, wherein the coolant comprises carbon dioxide gas, and wherein the vehicle air conditioning system is operated with the coolant in the external heat exchanger being pressurized not lower than the critical pressure of the coolant.

5. The vehicle air conditioning system according to claim 4, wherein the branch paths include one branch path in which the coolant always flows while the compressor is put in operation, and the vehicle air conditioning system further comprises an accumulator between an outlet of the one of the evaporators connected to the one branch path and the inlet of the tubular heat exchanger.

* * * * *